United States Patent
Chambers et al.

[19]

[11] Patent Number: 5,884,052
[45] Date of Patent: Mar. 16, 1999

[54] SMART RETRY MECHANISM TO PROGRAM THE RETRY LATENCY OF A PCI INITIATOR AGENT

[75] Inventors: Peter Chambers; Ken Jaramillo, both of Phoenix, Ariz.

[73] Assignee: VLSI Technology, Inc., San Jose, Calif.

[21] Appl. No.: 897,216

[22] Filed: Jul. 14, 1997

[51] Int. Cl.⁶ .............................. G06F 13/14; G06F 13/36
[52] U.S. Cl. ............................................................ 395/287
[58] Field of Search ................................... 395/287, 306, 395/298, 305, 285

[56] References Cited

U.S. PATENT DOCUMENTS

| | | | |
|---|---|---|---|
| 4,281,380 | 7/1981 | DeMesa, III et al. | 395/299 |
| 5,227,775 | 7/1993 | Bruckert et al. | 340/825.25 |
| 5,717,872 | 2/1998 | Whittaker | 395/285 |
| 5,771,235 | 6/1998 | Tang et al. | 370/446 |

*Primary Examiner*—Gopal C. Ray
*Attorney, Agent, or Firm*—Wagner,Murabito&Hao

[57] ABSTRACT

The present invention comprises a smart retry system for a PCI (peripheral component interconnect) agent in a PCI bus system. The system of the present invention includes an initiator PCI agent and a retry delay register coupled to the initiator PCI agent. The initiator PCI agent is adapted to couple to a PCI bus to communicate with a target PCI agent, via the PCI bus, by initiating a data transaction. The retry delay register is coupled to the PCI agent and the PCI bus. The retry delay register is adapted to receive a delay input via the PCI bus. The delay input describes a latency period of the target PCI agent, wherein the latency period is the amount of the delay. The retry delay register couples the delay input to the initiator PCI agent such that the initiator PCI agent initiates a retry at the expiration of the latency period of the target PCI agent in order to efficiently execute an access to the target PCI agent.

22 Claims, 7 Drawing Sheets

SMART RETRY MECHANISM TO PROGRAM THE RETRY LATENCY OF A PCI INITIATOR AGENT

TECHNICAL FIELD

The present invention pertains to the field of computer system bus architectures. More particularly, the present invention relates to a programmable retry mechanism to reduce unnecessary retry bus transactions between initiating devices and target devices.

BACKGROUND ART

A bus architecture of a computer system conveys much of the information and signals involved in the computer system's operation. In a typical computer system, one or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. With many peripheral devices, such as graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates it transaction (e.g., data transfer) with a "target" or slave device (e.g., main memory 104). When the data transaction is complete, the PCI agent relinquishes ownership of the PCI bus, allowing arbiter 106 to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification - Revision 2.1). Where each of PCI agents 114–124 are high performance, well designed devices, data transfer rates of up to 528 Mbytes per second can be achieved (e.g., PCI bus 112 operating at 66 MHz).

There is a problem, however, when PCI bus architecture 100, as is often the case, includes PCI agents which are slower than others. Where one of PCI agents is much slower than the other PCI agents, this slowest PCI agent can potentially monopolize PCI bus 112, greatly harming the total data transfer bandwidth. For example, PCI agent 118 is an ISA (industry standard architecture) bus bridge. PCI agent 118 is thus much slower than the other PCI agents. Since the ISA bus runs much slower than the PCI bus and other peripheral devices coupled to the ISA bus can be slower still, PCI agent 118 can have a very slow access time. This causes an initiator (e.g., PCI agent 122) to wait for access, potentially tying up PCI bus 112 in the process.

In addition, it should be noted that there may be other reasons a target may have a slow access time. For example, the target may be busy with some internal activity and is unable to service the access at that time, or the access would generate some sort of internal conflict (e.g., with data ordering or coherency). Hence, to avoid monopolization problems, the PCI specification dictates that a target should issue a "retry" if its latency will exceed 16 PCI clock cycles. Accordingly, where a target "knows" it will be slow completing an access, it may issue a retry in order to free up the PCI bus for other initiators.

Prior Art FIG. 2 shows a diagram of a prior art access process 200. Process 200 is an access by a fast initiator PCI agent to a slow target PCI agent. The initiator PCI agent has a high data transfer rate (e.g., PCI agent 122) and the target PCI agent is a device having a slow data transfer rate and a high latency (e.g., PCI agent 118). On the left side of process 200, the initiator attempts to access the target, shown as the initial access. The initial access is comprised of the normal stages of a PCI data transaction (e.g., arbitration for bus ownership, receiving a grant signal from the arbiter, and the like). The initial access addresses and informs the target of the data to be transferred. The target, as described above, is an ISA bus bridge having a high latency period. In this example, the target has a latency of 16 PCI clock cycles. Accordingly, since the target cannot comply with the data transaction requested in the initial access, it issues a retry 201. This forces the initiator to relinquish the PCI bus (e.g., PCI bus 112) for use by other initiators. The initiator subsequently, arbitrates for and acquires the PCI bus for a second try. The target is still not ready, and thus, issues retry 202, forcing the initiator to again relinquish the PCI bus.

Hence, as shown in process 200, the initiator continually attempts to execute its data transaction, and continually is forced to retry. This process proceeds through the third and fourth try, and their respective retries 203 and 204. After retry 204, the 16 PCI clock cycle latency of the target expires, and finally, the initiator achieves a completed access. However, during the second try, the third try, and the fourth try, the PCI bus is tied up by the initiator and is unavailable to other requesting PCI agents. In this manner, the initiator repeatedly attempting to access the slow target causes a decrease in the availability of the PCI bus with respect to the other PCI agents. This diminishes the total data transfer bandwidth of the PCI bus, and hence, the functionality of the computer system. In addition, since the initiator has no way of knowing when the target will be ready to complete its access, the initiator must continually retry, not knowing when the latency period will expire. This ultimately leads to longer access times for the initiator since each time it attempts to access the target, it must arbitrate for, and be granted, the PCI bus.

Thus, what is required is method and system which minimizes or even eliminates the wasted retry accesses where a faster initiator PCI agent continually attempts to access a slower target PCI agent. The required system should reduce the effective access time for the retrying PCI agents, reducing the effects of repeated access attempts and making the data transaction process with the slower target PCI agent more efficient. The required system should significantly increase the available PCI bus data transfer bandwidth available to other PCI agents. In addition, the required system should provide for the issue of a retry access at an optimal time. The present invention provides a novel solution to the above requirements.

DISCLOSURE OF THE INVENTION

The present invention is a novel method and system which minimizes or even eliminates the wasted retry access where a faster initiator PCI agent continually attempts to access a slower target PCI agent. The system of the present invention reduces the effective access time for the retrying PCI agents, thus reducing the effects of repeated access attempts on the PCI bus and making the data transaction process with the slower target PCI agent more efficient. The system of the present invention significantly increases the available PCI bus data transfer bandwidth available to other PCI agents. In addition, the present invention provides for the issue of a retry access at an optimal time.

In one embodiment, the present invention comprises a smart retry system for a PCI agent in a PCI bus system. The system of the present invention includes an initiator PCI agent and a retry delay register coupled to the initiator PCI agent. The initiator PCI agent is adapted to couple to a PCI bus to communicate with a target PCI agent, via the PCI bus, by initiating a data transaction. The retry delay register is coupled to the PCI agent and the PCI bus. The retry delay register is adapted to receive a delay input via the PCI bus. The delay input describes a latency period of the target PCI agent, wherein the latency period is, for example, the period of time between an initial access and when the requested data is available within the target. The retry delay register couples the delay input to the initiator PCI agent such that the initiator PCI agent initiates a subsequent access (e.g., a retry access) at the expiration of the latency period of the target PCI agent. In so doing, the system of the present invention allows the initiator PCI agent to issue a retry access at an optimal time, when the required data or resources of the target PCI agent are available.

In another embodiment, the present invention includes a smart retry state machine coupled to the initiator PCI agent and the retry delay register. The smart retry state machine tracks the cycles of the PCI bus and asserts and deasserts the PCI bus request signal on behalf of the initiator PCI agent. In so doing, the smart retry state machine inserts a delay into a retry access from the initiator PCI agent such that the retry access occurs at the optimal time. The delay inserted by the smart retry state machine corresponds to the delay input. In this manner, the system of the present invention implements a smart retry process with pre-existing PCI agents not specifically designed to support the process of the present invention. This allows the smart retry process of the present invention to be "retrofitted" to a pre-existing PCI agents, modifying them such that they accesses target PCI agents more efficiently.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, a smart retry mechanism to program the retry latency of an initiator PCI agent, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention, a smart retry mechanism to program the retry latency of an initiator PCI agent, provides a method and system which minimizes or even eliminates the wasted retry access where a faster initiator PCI agent continually attempts to access a slower target PCI agent. The system of the present invention reduces the effective access time for the retrying PCI agents, thus reducing the effects of repeated access attempts and making the data transaction process with the slower target PCI agent more efficient. The system of the present invention significantly increases the available PCI bus data transfer bandwidth available to other PCI agents. In addition, the present invention provides for the issue of a retry access at an optimal time. The present invention and its benefits are discussed in greater detail below.

Figure 1:
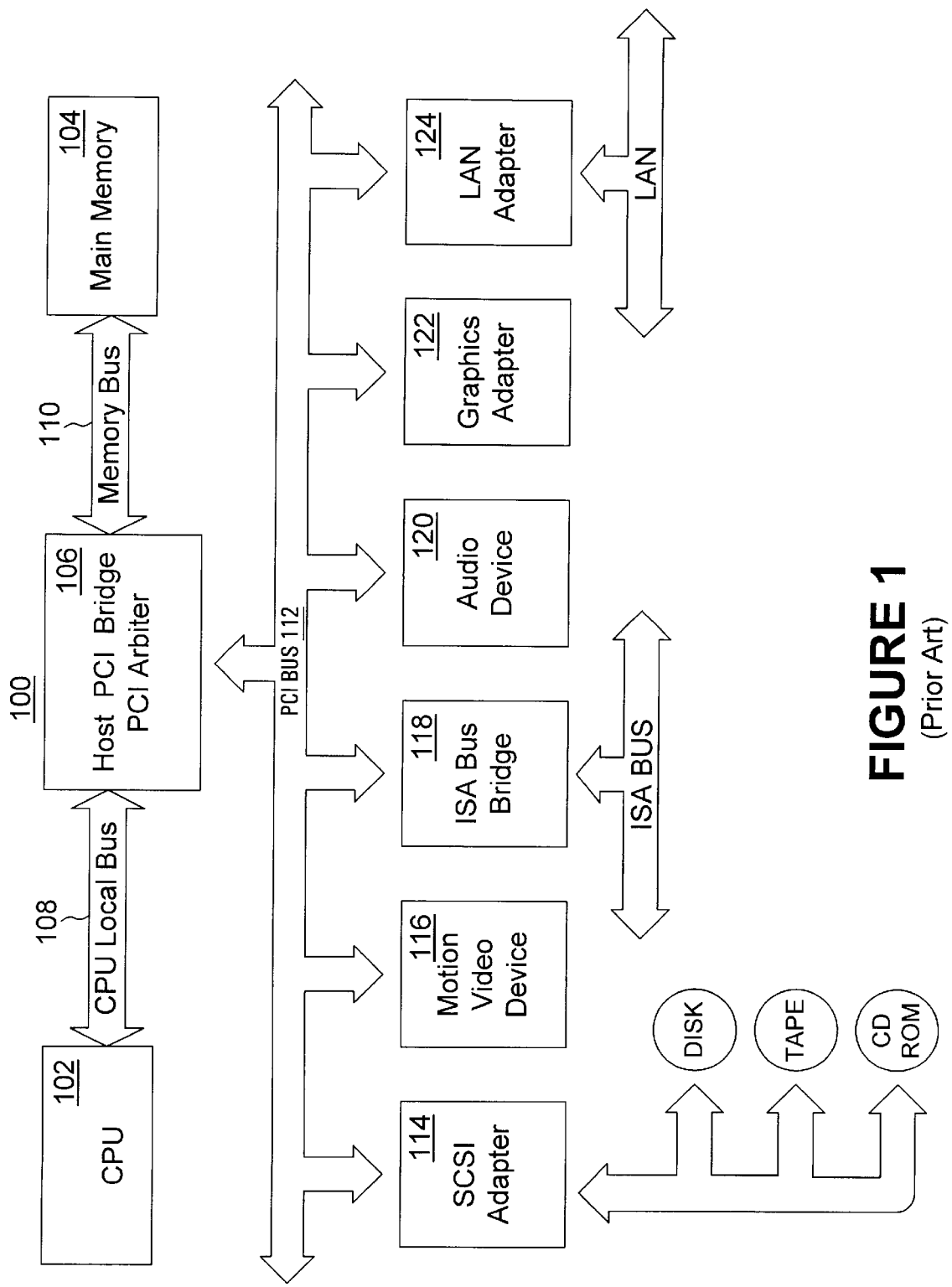
FIG. 1 shows a typical PCI bus architecture of the prior art.
Figure 2:
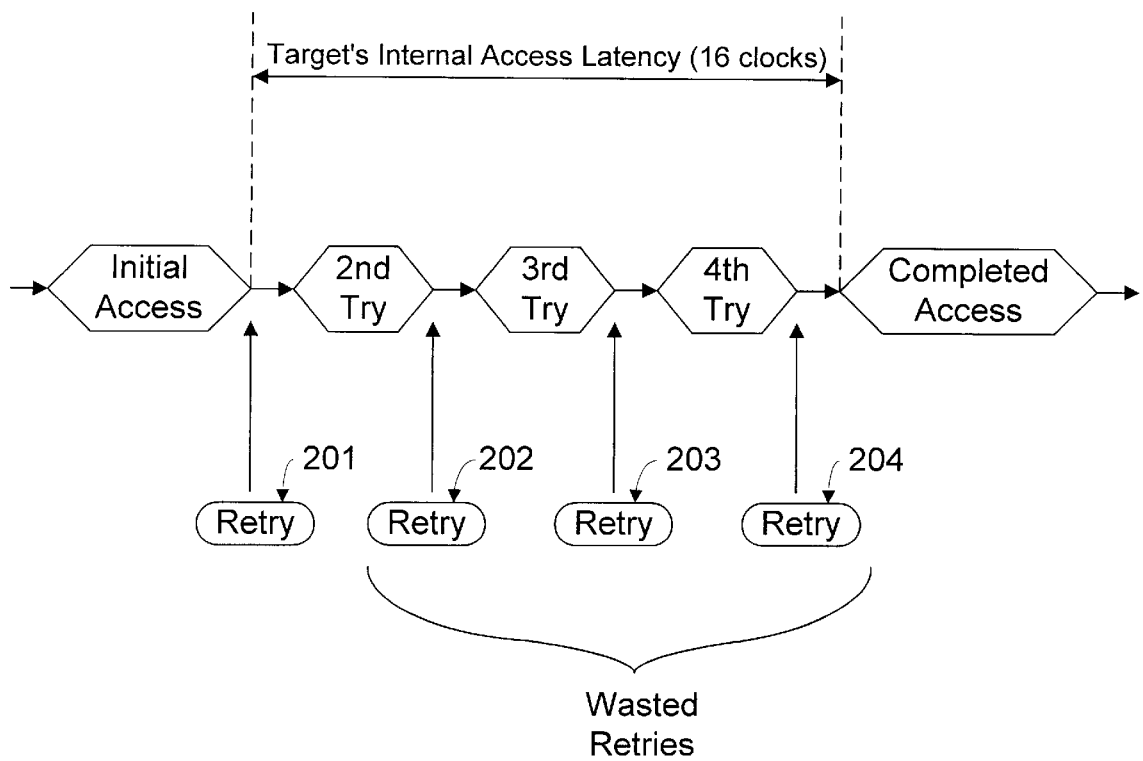
FIG. 2 shows an attempted access by a fast initiator PCI agent to a slow target PCI agent.
Figure 3:
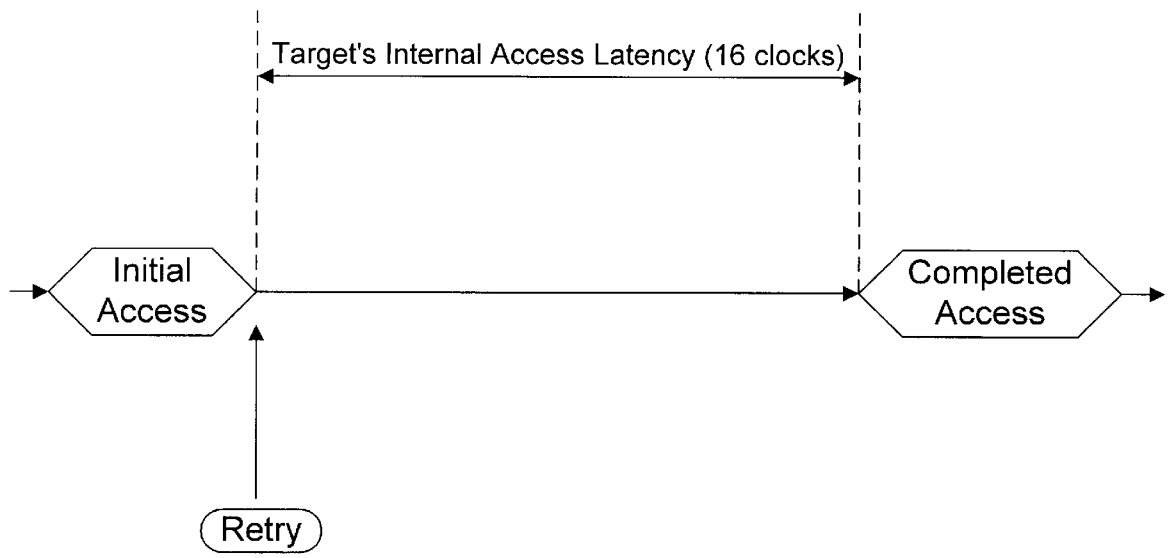
FIG. 3 shows a diagram of a smart retry access process in accordance with one embodiment of the present invention.

FIG. 3 shows a diagram of a smart retry access process 300 in accordance with one embodiment of the present invention. Diagram 300 shows a data transaction between an initiator PCI agent and a target PCI agent. The initiator PCI agent is a relatively high performance PCI agent having a low latency. The target PCI agent is a relatively slow performing, high latency PCI agent. On the left side of process 300, an initial access from the initiator to the target is shown. On the right side of process 300, a completed access is shown.

The initial access is a data transaction from the initiator to the target. Due to the target's data access latency, the target issues a retry, causing the initiator to terminate the data transaction before completion. The target, as shown in FIG. 3, has an internal access latency of 16 PCI clock cycles. The process of the present invention functions by accounting for the latency of the target such that the subsequent access after the retry is timed to occur when the requested data is available internally within the target. Hence, in process 300, after the initial access, the initiator waits until the expiration of the target's internal access latency (16 PCI clock cycles) and then accesses the target again, resulting in a completed access. In this manner, the process of the present invention allows the initiator to time a subsequent access after a retry to coincide with the readiness of the data or resources within the target, thus allowing the issue of a retry access at an optimal time. Where the latency of a target PCI agent is known, the process of the present invention allows the reduction of wasted retries, thereby increasing the data transfer bandwidth of the PCI bus.

Referring still to FIG. 3, the target PCI agent from process 300 has a known internal access latency of 16 PCI clock cycles. A system in accordance with the present invention utilizes this known access latency to substantially eliminate retries during the latency period. The known internal access latency period is characterized as a "delay input" and is passed to the respective initiator PCI agents within a computer system. Using the delay input, the initiator PCI agents can properly account for the internal access latency of the target during their subsequent accesses. Consequently, the process of the present invention can eliminate wasted retries, wasted PCI bus accesses, and the wasted PCI bus data transfer bandwidth associated with prior art, repetitive retry access attempts. Thus, process 300 has no wasted retried accesses.

It should be noted that there can be many differing degrees of internal access latency in various target PCI agents. Most computer systems include PCI targets which have variable latency characteristics. Typically, the target's access latency will have a range with a minimum (e.g., 16 PCI clocks) and a maximum (e.g., 100 PCI clocks). In such a case, an initiator in accordance with the present invention implements a variable retry strategy which waits, for example, 16 PCI clocks before the first retry access, then reverts to retrying every 2 PCI clock cycles. Hence, such a retry strategy can be described as a "16, 2, 2 2 . . . " strategy. For accesses to particularly slow targets, a "24, 2, 2, 2 . . . " strategy, where the initiator waits 24 clock cycles before the first retry access, can be employed.

Accordingly, the variable retry strategy of the present invention can be characterized as "n, 2, 2, 2 . . . " where n is predicted or expected delay of the target. The variable retry delay strategy of the present invention compares favorably to the prior art "2, 2, 2 . . . " scheme which has no initial delay and inserts a number of wasted retries. Additionally, other retry strategies in accordance with the present invention are also possible (e.g. 16-8-4-2-2-2. . .). In the present embodiment, the "n-2-2-2 . . . " strategy is utilized since it provides a good compromise between performance, simplicity, and PCI bus bandwidth.

Figure 4:
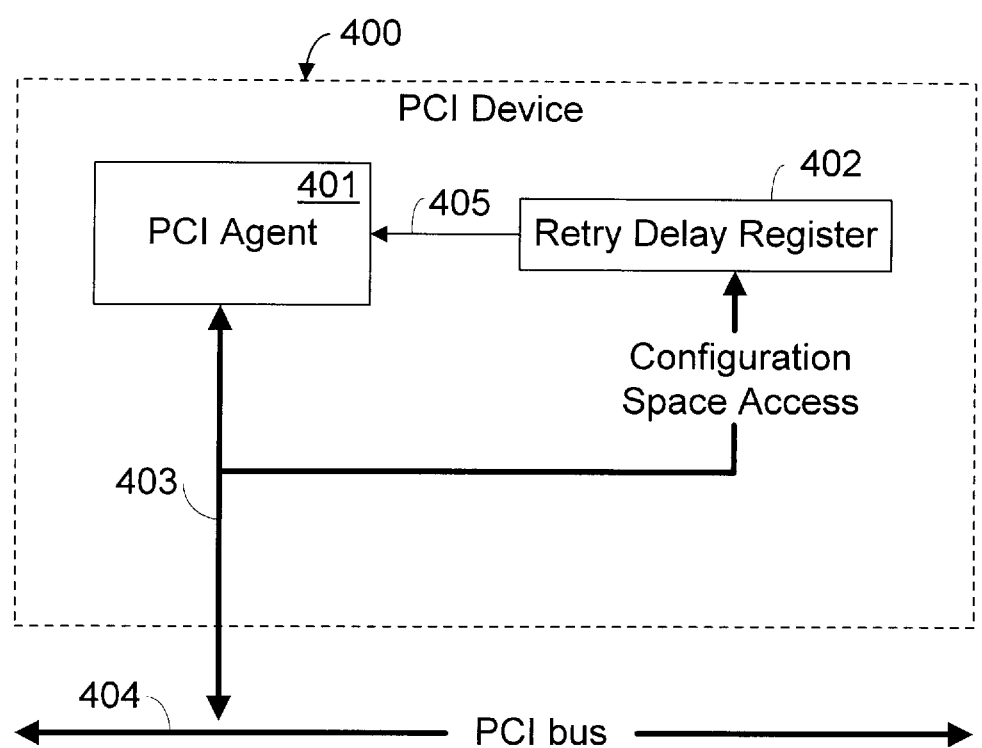
FIG. 4 shows a PCI device in accordance with one embodiment of the present invention.

With reference now to FIG. 4, a PCI device 400 in accordance with one embodiment of the present invention is shown. PCI device 400 shows one implementation of an initiator PCI agent which utilizes the smart retry process of the present invention. PCI device 400 includes PCI agent 401, retry delay register 402, and PCI bus connector 403. PCI agent 401 and retry delay register 402 are both coupled to PCI bus 404 via PCI bus connector 403. PCI agent 401 and retry delay register 402 communicate via line 405. In the present embodiment, PCI device 400 comprises a PCI expansion card for a computer system.

The present PCI device 400 is an PCI device designed to support the smart retry process of the present invention. The provisions for retry delay register 402 were included when PCI device 400 was designed and fabricated. Hence, retry delay register 402 and PCI agent 401 where designed and fabricated to work together. In the present embodiment, the retry delay register functions by storing the initial delay time period (e.g., the delay input) of the variable retry delay process of the present invention.

Where the retry delay process is "n, 2, 2, 2 . . . ", the retry delay register stores the value of "n". Thus, for example, where the retry delay process is "16, 2, 2, 2 . . . " the retry delay register stores a delay input of 16. The delay input is communicated to the PCI agent 401 via bus 405 where it is used to optimally time the access following the first retry.

In the present embodiment, retry delay register 402 is loaded via PCI bus 404 through a configuration space access. PCI device 400, in accordance with the PCI specification, supports configuration accesses to its internal configuration registers. These registers are typically accessed at system start up time and are used to configure PCI device 400 for the proper memory or input- output address ranges assigned to it. A configuration access, or more specifically, a configuration transaction, is used to write data to these registers. In the present embodiment, retry delay register 402 is written to in the same manner. Just as configuration information is written to the configuration registers of PCI device 400, the delay input for the target PCI agent is written to retry delay register 402. As described above, the value of the delay input is selected to correspond to the latency of the target PCI agent.

Figure 5:
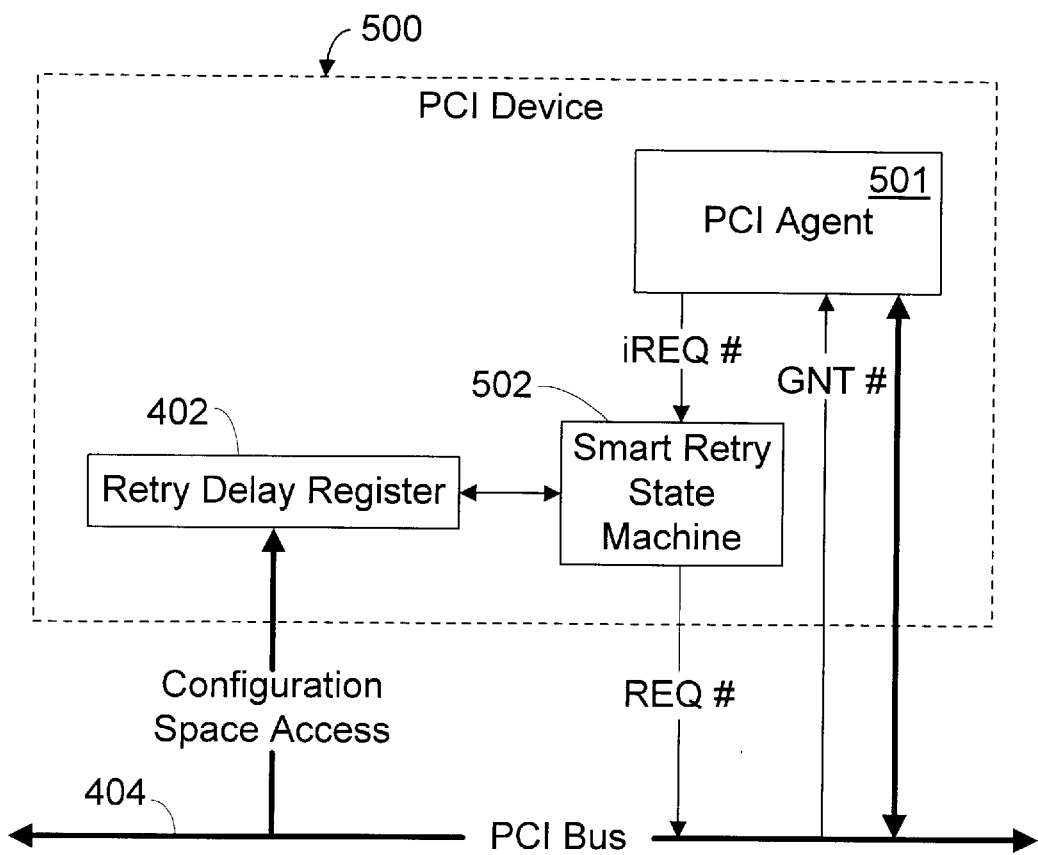
FIG. 5 shows a PCI device in accordance with another embodiment of the present invention.

Referring now to FIG. 5, a PCI device 500 in accordance with another embodiment of the present invention is shown. PCI device 500 shows another implementation of the system of the present invention. PCI device 500 includes an initiator PCI agent 501 and a smart retry state machine 502, in addition to retry delay register 402 and PCI bus 404. PCI device 500, similarly to PCI device 400, comprises a PCI expansion card for a computer system. PCI device 500, however, is a pre-existing PCI device modified to function in accordance with the present invention. Hence, PCI device 500 shows the system of the present invention can be implemented as an add-on system for pre-existing PCI agent designs (e.g., PCI device 500), in addition to original PCI agent designs (e.g., PCI device 400).

To implement the variable retry delay process of the present invention in a pre-existing PCI agent, smart retry state machine 502 is required in addition to retry delay register 402. The smart retry state machine 502 is installed between the request signal line of PCI agent 501 and PCI bus 404. The smart retry state machine 502 functions by intercepting the request input from the PCI agent 501 and subsequently issuing a delayed request to PCI bus 404 in its place. Smart retry state machine 502 tracks the PCI cycles (e.g., request, grant, frame, etc.) and inserts a delay in accordance with the process of the present invention into the request line from PCI agent 501 if the pending access is for a target having a known latency. Thus, the request signal line from PCI agent 501 becomes an internal request line iREQ# and the smart retry state machine 502 issues the standard PCI signal REQ# itself.

In the present embodiment, the retry delay register 402 is within the same PCI device as PCI agent 501. In the same manner as PCI device 400, retry delay register 402 receives the delay input via PCI bus 404 through a configuration access. The delay input is subsequently used by smart retry state machine 502 to appropriately time the issue of the request signal REQ#, thus, properly timing the access following the first retry. When the REQ# signal is issued by smart retry state machine 502, the corresponding grant signal GNT# is received by PCI agent 501, and the access to the target begins.

Figure 6:
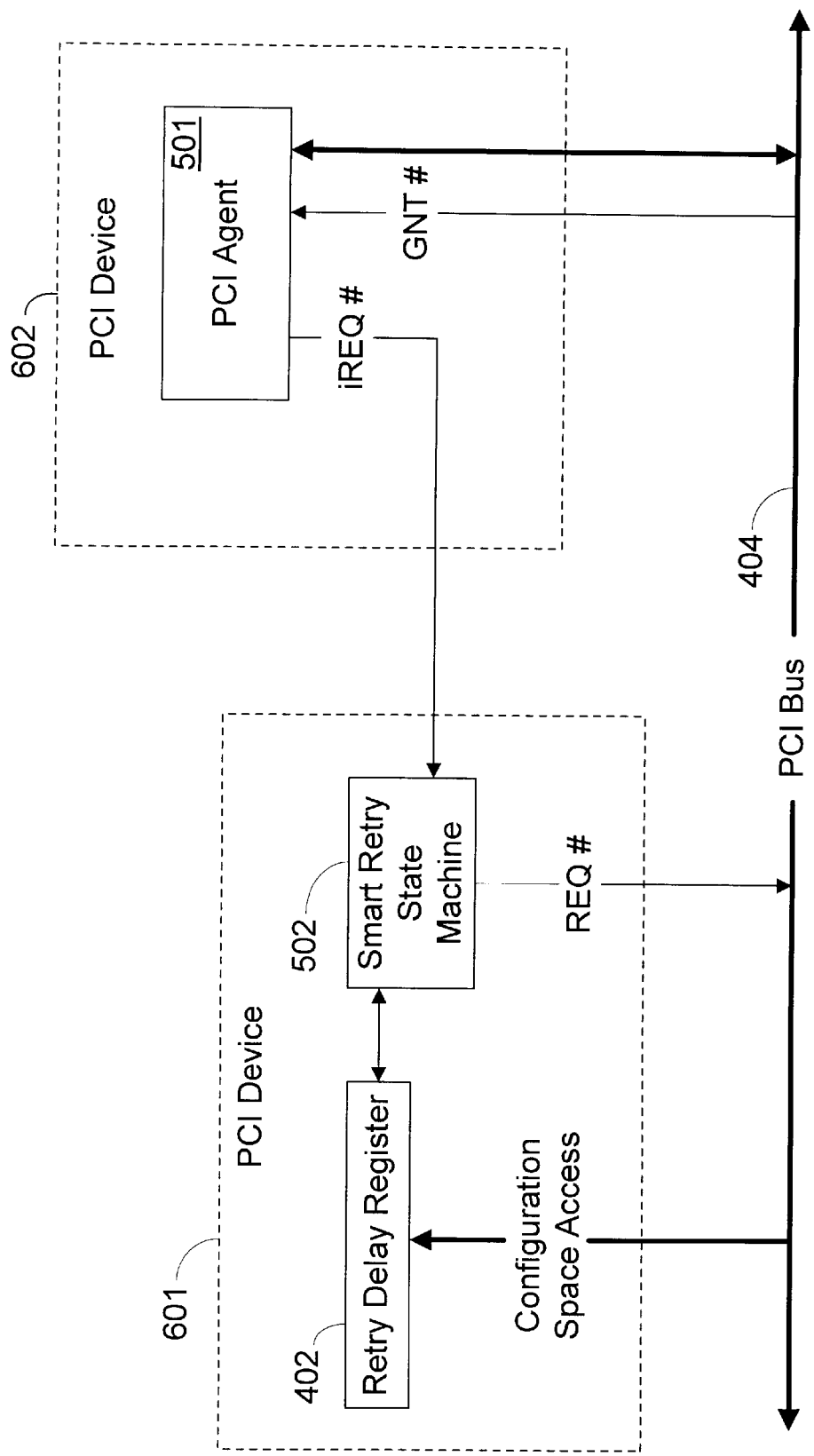
FIG. 6 shows a PCI device in accordance with yet another embodiment of the present invention.

Referring now to FIG. 6, a PCI device 601 and a PCI device 602 in accordance with yet another embodiment of the system of the present invention is shown. As in PCI device 500, PCI device 602 is a pre-existing PCI device modified to function in accordance with the system of the present invention. With PCI device 602, however, the smart retry state machine 502 and the retry delay register 402 are located in a separate device, PCI device 601. PCI agent 501 is coupled to smart retry state machine 502 via an iREQ# line between the two devices. In the present embodiment, retry delay register 402 is loaded with the delay input via a configuration access to PCI device 601. Smart retry state machine 502 uses the delay input to properly time the issue of the REQ# signal, inserting the appropriate amount of delay to the iREQ# signal received from PCI agent 501. The returning grant signal GNT# is received by PCI agent 501, and access to the target begins.

In this manner the PCI device 601 can "retrofit" the system of the present invention onto PCI devices which, for whatever reason, cannot accommodate the retry delay register 402 and the smart retry state machine 502 within themselves. For example, the PCI device to be retrofitted may be too highly integrated to allow easy incorporation. The only modification to PCI device 602 required, in accordance with the present embodiment, is the rerouting of the REQ# signal line from PCI agent 501 (such that it becomes iREQ#).

It should be appreciated that the specific embodiments of the present invention, for example PCI device 400, PCI device 500, and PCI devices 601 and 602, are presented for purposes of illustration and description. As is obvious to those skilled in the art, many modifications and variations are possible, in light of the above teaching, while remaining within the scope of the present invention. The system of the present invention is well suited to such modifications and variations as are appropriate to the particular use contemplated.

Figure 7:
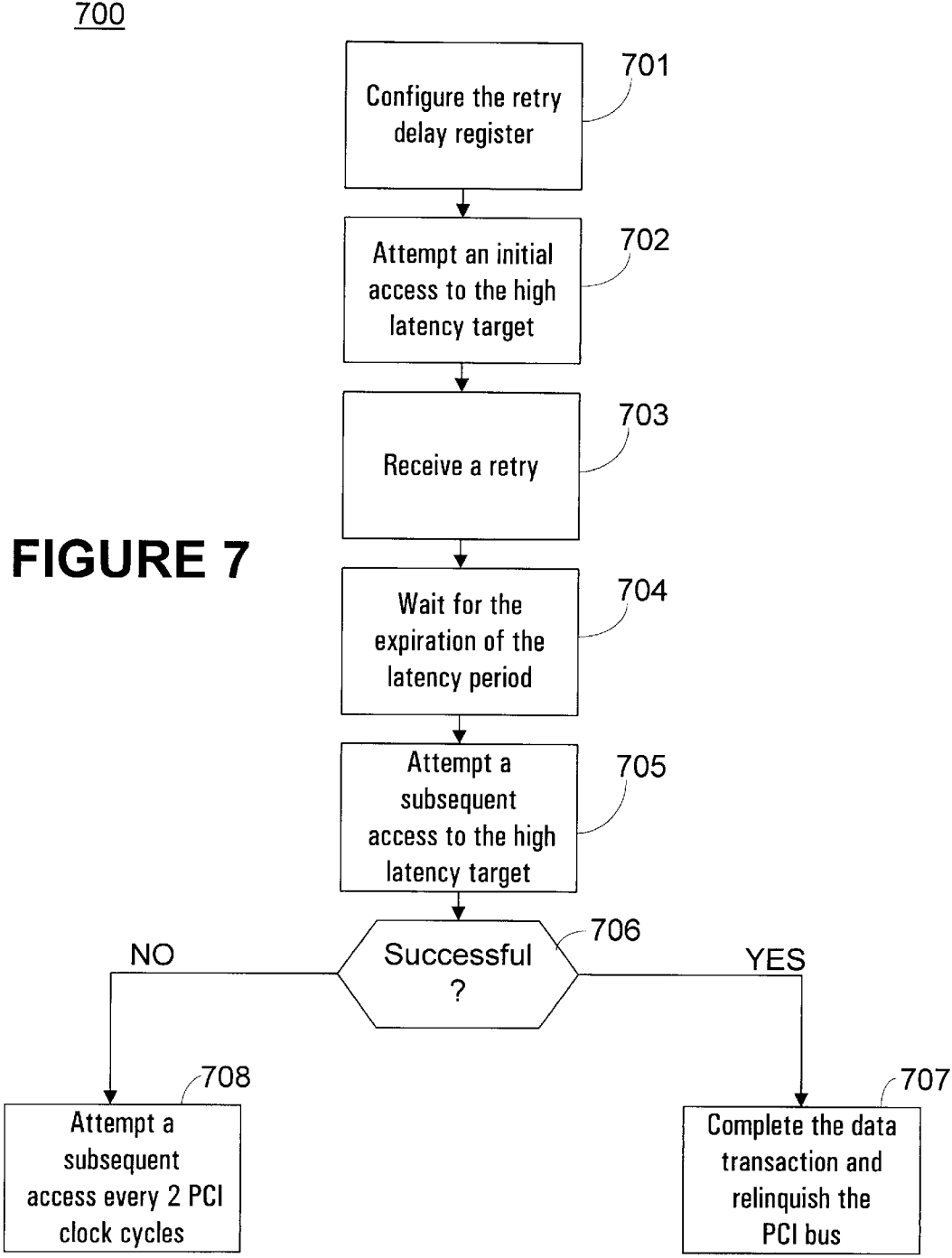
FIG. 7 shows a flow chart of the steps of a process in accordance with one embodiment of the present invention.

Referring now to FIG. 7, a flow chart of the steps of a process 700 in accordance with one embodiment of the present invention is shown. The process 700 of the present invention begins in step 701, where a retry delay register is configured for operation. In accordance with the present invention (e.g., PCI device 400), a retry delay register (e.g., retry delay register 402) is configured for operation by loading an appropriate initial delay (e.g., the delay input). As described above, the delay input describes the latency of a particular high latency target PCI agent. The delay input is loaded into the retry delay register during a configuration access.

In step 702, the PCI agent (e.g., PCI agent 401) in accordance with the present invention attempts an initial access to the high latency target. The PCI device arbitrates for and is granted ownership of the PCI bus, and initiates a data transaction with the target device. Due to the high latency of the target, however, the data transaction is not completed and the target issues a retry.

In step 703, the PCI agent receives the retry from the target. Consequently, the PCI agent terminates the data transaction and relinquishes the PCI bus. The PCI bus is now available for use by any other coupled PCI device. While a prior art PCI agent would initiate a subsequent access after two PCI clock cycles, the PCI agent in accordance with the system of the present invention waits for the optimal time.

In step 704, the PCI agent waits in accordance with the delay input stored in the retry delay register. As described above, the value of the delay input is determined with respect to the latency of the target PCI agent. If the delay input is 16 PCI clock cycles, for example, the PCI agent will wait that number of clock cycles before attempting a subsequent access. The delay input value is decremented with the PCI clock, such that upon expiration, the PCI agent reattempts the access.

In step 705, the PCI agent attempts a subsequent access to the high latency target. As described above, the delay input has expired, thus, the PCI agent arbitrates for and acquires ownership of the PCI bus. The target is addressed and the access reattempted. In step 706, the process 700 of the present invention determines whether the access is successful. If the access is successful, process 700 proceeds to step 707. If the access is not successful, process 700 proceeds to step 708.

In step 707, where the subsequent access was successful, the PCI agent completes its data transaction with the target and relinquishes the PCI bus. The PCI agent, using the delay input, has successfully accounted for the latency of the target and issued its subsequent access at the optimal time. In so doing, the PCI bus was available for other PCI agents, without the interference associated with wasted retries.

In step 708, where the subsequent access was not successful, the PCI agent reverts to the standard process, where an access is attempted every two PCI clock cycles until the target is ready to comply. Even in this case, however, the system of the present invention places fewer wasted retried access into the data transfer bandwidth of the PCI bus, since there are no access attempts before the expiration of the delay input.

Thus, the present invention provides a method and system which minimizes or even eliminates the wasted retry accesses, where a faster initiator PCI agent continually attempts to access a slower target PCI agent. The system of the present invention reduces the effective access time for the retrying PCI agents, thus reducing the effects of repeated attempts and making the data transaction process with the slower target PCI agent more efficient. The system of the present invention significantly increases the available PCI bus data transfer bandwidth available to other PCI agents. In addition, the present invention provides for the issue of a retry access at an optimal time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A retry system for a PCI (peripheral component interconnect) agent in a PCI bus system, comprising:

an initiator PCI agent adapted to couple to a PCI bus, said initiator PCI agent further adapted to communicate via said PCI bus with a target PCI agent by initiating a data transaction; and a retry delay register coupled to said initiator PCI agent and said PCI bus, said retry delay register adapted to receive a delay input via said PCI bus, said delay input describing a latency period of said target PCI agent, said retry delay register adapted to couple said delay input to said initiator PCI agent such that said initiator PCI agent initiates a subsequent access to said target PCI agent at the expiration of said latency period in order to efficiently complete said subsequent access to said target PCI agent.

2. The retry system of claim 1, wherein said initiator PCI agent and said retry delay register are fabricated into a single device.

3. The retry system of claim 1, wherein said retry delay register is adapted to receive said delay input via a configuration access.

4. The retry system of claim 1, wherein said delay input comprises an initial delay value, said initial delay value describing the latency of said target PCI agent.

5. The retry system of claim 4, wherein said initiator PCI agent initiates said subsequent access to said target PCI agent at a time indicated by said initial delay value, and where said subsequent access is not completed with said target PCI agent, said initiator PCI agent attempts a successive access with said target PCI agent at a predetermined interval.

6. The retry system of claim 5, wherein said initiator PCI agent continually attempts said, successive access at said predetermined interval until said successive access is completed.

7. The retry delay system of claim 5, wherein said initial delay value is a first number of PCI bus clock cycles and said predetermined interval is a second number of PCI bus clock cycles, said first number being larger than said second number.

8. A retry system for a PCI (peripheral component interconnect) agent in a PCI bus system, comprising:

an initiator PCI agent adapted to couple to a PCI bus, said initiator PCI agent further adapted to communicate via said PCI bus with a target PCI agent by initiating a data transaction;

a retry delay state machine coupled to said initiator PCI agent and coupled to said PCI bus, said retry delay state machine adapted to monitor said PCI bus and request ownership of said PCI bus on behalf of said initiator PCI agent; and a retry delay register coupled to said retry delay state machine and said PCI bus, said retry delay register adapted to receive a delay input via said PCI bus, said delay input describing a latency period of said target PCI agent, said retry delay register adapted to couple said delay input to said retry delay state machine, said retry delay state machine adapted to request ownership of said PCI bus such that said initiator PCI agent initiates a subsequent access to said target PCI agent at the expiration of said latency period in order to efficiently complete said subsequent access to said target PCI agent.

9. The retry system of claim 8, wherein said initiator PCI agent, said retry delay state machine, and said retry delay register are fabricated into a single device.

10. The retry system of claim 8, wherein said initiator PCI agent is fabricated into a first device and said retry delay state machine and said retry delay register are fabricated into a second device.

11. The retry system of claim 8, wherein said retry delay register is adapted to receive said delay input via a configuration access.

12. The retry system of claim 8, wherein said retry delay state machine is coupled to receive an request signal from said PCI agent and assert said request signal on said PCI bus on behalf of said PCI agent, said request signal asserted in accordance with said delay input.

13. The retry system of claim 8, wherein said delay input comprises an initial delay value, said initial delay value describing the latency of said target PCI agent.

14. The retry system of claim 13, wherein said subsequent access to said target PCI agent occurs at a time indicated by said initial delay value, and where said subsequent access is not completed with said target PCI agent, said initiator PCI agent attempts a successive access with said target PCI agent at a predetermined interval.

15. The retry system of claim 14, wherein said initiator PCI agent continually attempts said successive access at said predetermined interval until said successive access is completed.

16. The retry delay system of claim 15, wherein said initial delay value is a first number of PCI bus clock cycles and said predetermined interval is a second number of PCI bus clock cycles, said first number being larger than said second number.

17. In a computer system including a PCI (peripheral component interconnect) bus, an initiator PCI agent, and a target PCI agent, a smart retry process for initiating subsequent accesses to the target PCI agent after the target PCI agent issues a retry, the process comprising the steps of:

a) configuring a retry delay register coupled to an initiator PCI agent with an initial delay input describing the latency of said target PCI agent;

b) attempting an initial access to the target PCI agent by the initiator PCI agent;

c) receiving a retry from the target PCI agent;

d) waiting for the expiration of a latency period described by said initial delay input;

e) attempting a subsequent access to the target PCI agent at the expiration of the latency period; and f) completing the data transaction between the initiator PCI agent and the target PCI agent in accordance with the subsequent access.

18. The process of claim 17 wherein step a) further comprises loading said retry delay register with said initial delay input.

19. The process of claim 18 wherein step a) further comprises loading said retry delay register via a configuration access from a PCI bus.

20. The process of claim 19 wherein step d) further includes waiting a number of PCI clock cycles, wherein said initial delay input determines said number of PCI clock cycles.

21. The process of claim 17 further including the step of initiating a successive access at a predetermined interval, if said subsequent access was not completed.

22. The method of claim 21 wherein the step of initiating a successive access at said predetermined interval, said predetermined interval being a first time period, said initial delay input being a second time period, said first time period shorter than said second time period.

* * * * *